(12) United States Patent
Losego

(10) Patent No.: US 6,279,672 B1
(45) Date of Patent: Aug. 28, 2001

(54) MOTORIZATION SYSTEM FOR A MERCHANDISE CART

(76) Inventor: Martine Losego, 12, Allée des Géraniums BP.90, 78260 Achères (FR)

(*) Notice: Under 35 U.S.C. 154(b), the term of this patent shall be extended for 0 days.

(21) Appl. No.: 09/546,868

(22) Filed: Apr. 10, 2000

Related U.S. Application Data

(63) Continuation of application No. PCT/FR98/02172, filed on Oct. 9, 1998.

(30) Foreign Application Priority Data

Oct. 10, 1987 (FR) .................................................. 97/12658

(51) Int. Cl.$^7$ ........................................................ B60K 1/00
(52) U.S. Cl. ............................................ 180/65.1; 180/65.8
(58) Field of Search .................................. 180/65.1, 6.5, 180/6.28, 65.5, 65.8, 233, 234, 443; 280/33.992, 33.991

(56) References Cited

U.S. PATENT DOCUMENTS

| | | | | |
|---|---|---|---|---|
| 3,818,292 | * | 6/1974 | Berman | 318/139 |
| 4,020,916 | * | 5/1977 | Noble | 180/65 R |
| 4,807,716 | * | 2/1989 | Hawkins | 180/65.1 |
| 5,064,012 | * | 11/1991 | Losego | 180/19.1 |
| 5,350,982 | * | 9/1994 | Seib | 318/139 |
| 5,439,071 | * | 8/1995 | Rodriguez-Ferre | 180/167 |
| 5,689,174 | * | 11/1997 | Pacheco, Sr. | 322/16 |
| 5,743,347 | * | 4/1998 | Gingerich | 180/65.1 |
| 5,899,285 | * | 5/1999 | Curbelo | 180/65.1 |
| 5,921,338 | * | 7/1999 | Edmondson | 180/65.5 |
| 6,089,341 | * | 7/2000 | Gingerich | 180/65.1 |

FOREIGN PATENT DOCUMENTS

| | | |
|---|---|---|
| 0 337 038 A1 | 10/1989 | (EP) . |
| 0 711 698 A2 | 5/1996 | (EP) . |
| 1408705 | 12/1965 | (FR) . |
| 2 521 923 | 8/1983 | (FR) . |
| 2 591 179 | 6/1987 | (FR) . |
| 2 604 662 | 4/1988 | (FR) . |

* cited by examiner

Primary Examiner—J. J. Swann
Assistant Examiner—J. Allen Shriver
(74) Attorney, Agent, or Firm—Schnader Harrison Segal & Lewis LLP

(57) ABSTRACT

A motorization system for a merchandise cart having at least two wheels including a direct current electric power storage unit; a power supply controller connected to the power storage unit; and two electric motors connected in series and connected to the controller, with each of the motors being operatively associated with one of the wheels and each motor having a nominal operating voltage equal to half the nominal output voltage of the power storage unit.

10 Claims, 1 Drawing Sheet

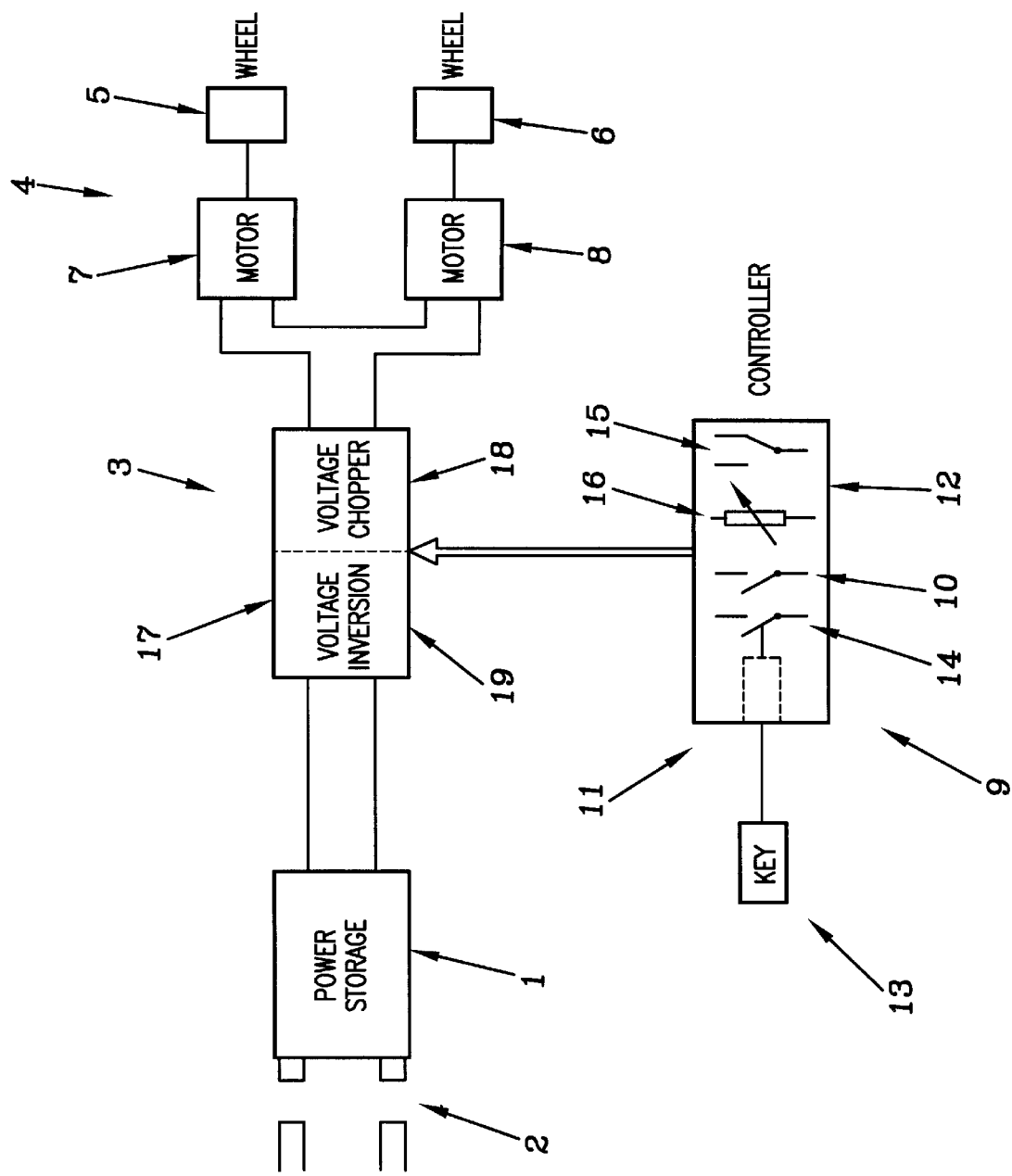

MOTORIZATION SYSTEM FOR A MERCHANDISE CART

RELATED APPLICATION

This is a continuation of International Application No. PCT/FR98/02172, with an international filing date of Oct. 9, 1998, which is based on French Patent Application No. 97/12658, filed Oct. 10, 1997.

FIELD OF THE INVENTION

This invention relates to a motorization system for a merchandise cart.

BACKGROUND

Merchandise carts are used, for example, in shopping malls and it has already been proposed to motorize them to make them easier to handle. In fact, such carts are frequently required to transport heavy and bulky merchandise which makes them difficult to handle.

For example, FR-A-2 591 179 and FR-A-2 604 662 contain descriptions of motorization systems for merchandise carts which comprise storage means for direct current electrical power connected via power supply control means to the motorization means associated with at least two wheels of the cart. EP 711698 describes a transport and distribution vehicle constituted of a chassis composed of side frames and cross pieces and equipped with a steering device comprised of an arched piece with handles which is supported on the ground by an axle bearing two rear, nonsteerable wheels and by two front wheels that can be steered independently of each other. One of the wheels of the bogie is driven by an electric motor to which it is connected by a power supply from a power source controlled by a progressively adjustable control device.

French Patent FR 2521923 describes a road vehicle with electric motor control with at least two driven wheels, with one electric motor control group per driven wheel respectively, a group of batteries and a control unit, the electric motor control groups being able to function with a high starting torque and enabling, by means of the control unit, switching between the starting state and the various speeds. The electric motor control groups are composed respectively of one or more series motors which, for starting and for city driving, can be coupled in series by means of the control unit. For rapid driving, at least one of the series motors can be coupled in parallel by means of the control unit. French Patent FR 1408705 describes another motor vehicle system.

However, in those cases, the motorization means associated with the two wheels of the cart have a single electric motor the output shaft of which is linked via a differential to the corresponding wheels of this car. It is known that this presents a certain number of drawbacks, especially at the level of the complexity of this structure. This, it is an object of the invention to resolve these problems.

SUMMARY OF THE INVENTION

The invention is a motorization system for a merchandise cart of the type comprising direct current electric power storage means connected via power supply control means to the motorization means associated with at least two wheels of the cart, wherein the motorization means comprises two electric motors connected in series, with each of the motors being associated with one of the corresponding wheels of the cart and each having a nominal operating voltage equal to half the nominal output voltage of the electric power storage means.

BRIEF DESCRIPTION OF THE DRAWING

A better understanding of the invention will be provided by the description below which is presented solely as an example and with reference to the attached drawing which shows a schematic diagram illustrating the structure of a motorization system for a merchandise cart according to the invention.

DETAILED DESCRIPTION OF THE INVENTION

The following description is intended to refer to specific embodiments of the invention illustrated in the drawing and is not intended to define or limit the invention, other than in the appended claims. Also, the drawing is not to scale and various dimensions and proportions are contemplated.

It can be seen in the drawing that a motorization system for a merchandise cart which comprises direct current electric power storage means designated by general reference (1). The electric power storage means (1) comprises, for example, a battery of the conventional type. In a conventional manner also, the battery is associated with means (2) for charging it, constituted of any suitable means known in the art. Such charging means may be activated for example, when the cart is in a storage position in a shed, in a supermarket parking lot or the like.

The electric power storage means (1) is connected via power supply control means designated by general reference (3) to the motorization means associated with at least two wheels of the cart.

The motorization means is designated by general reference (4) and is associated, for example, with two wheels (5 and 6) of the cart and constituted, for example, by the rear wheels of the cart.

According to the invention, the motorization means (4) comprises two electric motors designated by general references (7 and 8) which are connected in series and each of which is associated with one of the corresponding wheels of the cart, i.e., the wheels (5 and 6) in a conventional manner. Each motor has a nominal operating voltage equal to half of the nominal output voltage of the electric power storage means (1).

The power supply control means (3) for these motorization means comprises a control panel designated by general reference (9). The control panel is equipped with, for example, a start/stop switch designated by general reference (10), power supply control locking/unlocking means designated by general reference (11) and cart movement directional control means and movement speed regulation means, with these means being designated by general reference (12).

The locking/unlocking means (11) can comprise active position detection means in the panel (9) for portable means in key form for locking/unlocking the cart, the portable means being designated by general reference (13).

These cart locking/unlocking means in key form can, for example, be presented in the form of a token or coin of conventional type, or in the form of a card such as, for example, in the form of an integrated circuit card.

In a conventional manner, the user must introduce into the control panel (9), more specifically into a corresponding receptacle on the panel, the locking/unlocking means in key form in order to unlock the motorization system and thus the cart.

In the system according to the invention, when these locking/unlocking means in key form are introduced in active position into the panel, a switch designated by general reference (14) is switched to the closed position, for example, so as to allow operation of the system.

The means for controlling the direction and speed of the cart's movement designated by general reference (12) can comprise, for example, a power supply reversing switch designated by general reference (15) associated, for example, with speed regulation means designated by general reference (16) and schematized by a variable resistance in this figure.

It can now be understood that the user can select the direction and control the speed of the cart's movement via these means. Also, different modes of implementation of the various elements of this control panel are envisaged.

The control panel designated by general reference (9) is linked to a part of the power supply control means interposed between the electric power storage means (1) and the motorization means (4). This part of the control means is designated by general reference (17) and comprises, for example, voltage chopper means designated by general reference (18) and voltage inversion means designated by general reference (19), the operation of which is controlled by the user from the control panel (9).

The voltage inversion means (19) makes it possible to power the motorization means in one direction or the other to enable the cart to move forward or in reverse. The voltage chopper means make it possible to chop the power supply voltage of the motorization means to regulate their rate of rotation and thereby the speed of the cart. These various means can take the form of any suitable structure known in the art.

It will now be understood that the motorization system according to the invention presents a certain number of advantages in relation to the systems of the state of the art. In fact, by using two electric motors connected in series with each motor being associated with one of the corresponding wheels of the cart, it is no longer necessary to use a differential rotationally driving the two wheels of the car from a single motor. This makes it possible to simplify the structure of the means driving the wheels and, thus, to increase the reliability of the motorization system.

In addition, the use of the control panel as described above and the voltage cutter and voltage inversion means enable extremely reliable and precise control of the operation of the motors so as to control under all circumstances the movement of the cart.

The operation of these motorization means is managed by a start/stop switch or by locking/unlocking means to improve the security of use of the cart. In addition, these locking/unlocking means can also constitute the cart's anti-theft means to the extent that it is possible to control the distribution of the portable locking/unlocking means in key form that fit into the panel.

In fact, as previously stated, these means can be in the form of an integrated circuit card in which is stored, for example, a secret unlocking code that can be read by the other circuits of the panel, with this card being, for example, distributed on a controlled basis to identified users who are motivated in some manner to return this card after using the cart so as to avoid its theft.

According to one specific mode of implementation, the system according to the invention comprises a check-in card reader for the user's vehicle. The handle comprises a card reader, particularly but not exclusively a memory card reader. This reader is designed to receive a card that triggers the start-up of the electric motor. The card can be a card comprising an identification code cooperating with a card reader associated with a card authentication control circuit. This code can be compared to a list of codes stored in a memory file or a supplementary personal code submitted by the user.

In the absence of a card, or in the case of introduction of a card that is not recognized or an erroneous personal code, the cart's electric motor is not activated and the cart cannot be used.

The card can be distributed by an apparatus provided at the entry to a parking lot for the parking of the users' vehicles. The entry gate is controlled by a terminal that issues a utilization card to each driver. The card allows the driver to use a cart which is available in the parking lot or close to the parking lot. The number of parking spaces is preferably essentially identical to the number of carts.

After the user has finished his/her shopping, he/she returns the motorized cart to a specific site. Returning the cart to a designated site authorizes the release of the card. This card is required to control the opening of the exit gate. The driver cannot remove his/her vehicle from the parking lot without the card.

The card thus plays a vehicle check-in role and limits the risks of theft of the cart.

Although this invention has been described with reference to specific forms of apparatus and method steps, it will be apparent to one of ordinary skill in the art that various equivalents may be substituted, the sequence of steps may be varied, and certain steps may be used independently of others, all without departing from the spirit and scope of the invention defined in the appended claims.

What is claimed is:

1. A motorization system for a merchandise cart having at least two wheels comprising:

a direct current electric power storage unit;

a power supply controller connected to the power storage unit; and two electric motors connected in series and connected to the controller, with each of the motors being operatively connected to one of the wheels and each motor having a nominal operating voltage substantially equal to half the nominal output voltage of the power storage unit.

2. The motorization system according to claim 1, wherein the electric power storage unit is connectable to a charger.

3. The motorization system according to claim 1, wherein the power supply controller comprises one or more of a control panel having a start/stop switch, a locking/unlocking means for the power supply controller and a cart movement directional controller and speed regulator.

4. The motorization system according to claim 3, wherein the locking/unlocking means comprises active position detection means in the panel in the form of a cart locking/unlocking key.

5. The motorization system according to claim 4, wherein the means in key form are in the form of a token or a coin.

6. The motorization system according to claim 4, wherein the means in key form are in the form of an integrated circuit card.

7. The motorization system according to claim 4, wherein the detection means comprises a switch, the closing of which is brought about when the means in key form are engaged in the panel.

8. The motorization system according to claim 1, wherein the power supply controller comprises a voltage chopper means and means for inversion of the power supply voltage.

9. The motorization system according to claim 1, further comprising a check-in card reader for a user's vehicle.

10. A motorization system for a merchandise cart having at least two wheels comprising:

a direct current electric power storage unit;

a power supply controller connected to the power storage unit; and two electric motors connected in series and connected to the controller, with each of the motors being operatively connected to one of the wheels without a differential rotationally driving the wheels and each motor having a nominal operating voltage substantially equal to half the nominal output voltage of the power storage unit.

* * * * *